United States Patent

Bang

[19]

[11] Patent Number: 5,984,521
[45] Date of Patent: Nov. 16, 1999

[54] METHOD AND APPARATUS FOR GENERATING DESCRAMBLING DATA FOR CD-ROM DECODER

[75] Inventor: Sung-jo Bang, Seongnam, Rep. of Korea

[73] Assignee: Samsung ELectronics, Co., Ltd., Suwon, Rep. of Korea

[21] Appl. No.: 08/851,772

[22] Filed: May 6, 1997

[30] Foreign Application Priority Data

May 23, 1996 [KR] Rep. of Korea ......................... 96/17738

[51] Int. Cl.$^6$ .............................. H03M 7/00; G11B 20/14
[52] U.S. Cl. .............................. 371/2.1; 341/50; 369/59; 380/50
[58] Field of Search ................................. 369/59; 380/50; 371/2.1; 375/359; 341/93, 50

[56] References Cited

U.S. PATENT DOCUMENTS

| | | | |
|---|---|---|---|
| 4,603,413 | 7/1986 | Sinjou et al. | 369/59 |
| 4,965,881 | 10/1990 | Dilley | 380/50 |
| 5,031,129 | 7/1991 | Powell et al. | 364/717 |
| 5,231,667 | 7/1993 | Kojima | 380/28 |
| 5,241,602 | 8/1993 | Lee et al. | 380/44 |
| 5,257,254 | 10/1993 | Kutaragi | 369/50 |
| 5,323,463 | 6/1994 | Speiser | 380/9 |
| 5,448,640 | 9/1995 | Kim et al. | 380/48 |
| 5,732,066 | 3/1998 | Moriya et al. | 369/275.3 |
| 5,784,013 | 7/1998 | Burgard | 341/100 |

*Primary Examiner*—Stephen M. Baker
*Attorney, Agent, or Firm*—Marger Johnson & McCollom, P.C.

[57] ABSTRACT

Descrambled data is generated for a CD-ROM decoder and a descrambler. A lower first through fifteenth bits of the descrambled data are generated according to an equation $DSCR_0[x] = DSCR_{-1}[x+2] \oplus DSCR_{-1}[x+4]$, where $1 \leq i \leq 15$. The upper sixteenth through thirty-second bits of the descrambled data are generated according to the equation $DSCR_0[x] = DSCR_0[x-15] \oplus DSCR_0[x-14]$, where $16 \leq i \leq 32$. $DSCR_0[x]$ is an x-th bit of current 32-bit descrambled data, $DSCR_{-1}[x]$ is an x-th bit of preceding 32-bit descrambled data and a symbol $\oplus$ refers to an EX-OR operation.

7 Claims, 4 Drawing Sheets

METHOD AND APPARATUS FOR GENERATING DESCRAMBLING DATA FOR CD-ROM DECODER

BACKGROUND OF THE INVENTION

The present invention relates to a compact disk ROM (hereinafter, referred to as CD ROM) decoder, and more particularly, to a descrambling data generating circuit, the method thereof, and a descrambler.

In general, transmitted synchronous data having successive values of "0" or "1", might not be capable of proper synchronization by a receiver. To overcome this, a transmitter randomizes transmitted data using a scrambler. The receiver uses a descrambler to convert the received data into the original data. The scrambler divides the transmitted data by a constant polynomial. In turn, the descrambler multiplies the scrambled data by the constant polynomial converting the scrambled data into to the original data.

A compact disk digital audio (CD-DA) recording system employ scrambling to reduce the probability of generating the same sync signal pattern inserted into audio data. In the same manner, a CD ROM decoder performs a descrambling process in order to convert the scrambled data into the original data. The scrambled data is comprised of 2352 byte blocks that each include 12-bytes of sync data.

FIG. 1 is a block diagram of a CD ROM decoder, peripheral devices, and more particularly the position occupied by a descrambler in the CD system.

FIG. 2 is a block diagram of a conventional descrambler. Reference numerals 21, 23, 25, and 27 denote a descrambling data generator, a serial-parallel (S/P) converter, a data ordering unit and a sync detector, respectively. Reference numerals 29, 30, 31 and 33 denote a parallel-serial (P/S) converter, an exclusive-OR (EX-OR) gate, a S/P converter and an L-R separator, respectively.

The descrambling data generator 21 generates descrambling data (DSCR) according to a polynomial $[p(x)=X^{15}+X+1]$, and includes 15 serially connected flip-flops (F1–F15) and an EX-OR gate 22. The 15 flip-flops commonly receive a clock signal CLK via a clock terminal. The EX-OR gate 22 performs an EX-OR operation with respect to the output signals of the 14th and 15th flip-flops F14 and F15, and applies the result to an input terminal of the first flip-flop F1. The initial value of the descrambling data generator 21 is "000000000000001".

The S/P converter 23 converts serial data (SIDATA) input from a compact disk player (FIG. 1) into 16-bit parallel data. The data ordering unit 25 determines a data format according to a control signal (LMSEL) input from the compact disk player. The sync detector 27 detects sync signals from the data output from the data ordering unit 25. The sync signals include sync start, sync detect and sync end signals. The P/S converter 29 converts the 16-bit signals output from the data ordering unit 25 into one bit serial data.

The EX-OR gate 30 performs an exclusive OR operation with the output data DSCR of the descrambling data generator 21 and the output data of the P/S converter 29. The S/P converter 31 converts the one-bit serial data output from the EX-OR gate 30 into 16-bit parallel data. The L-R separator 33 separates the 16-bit data output from the S/P converter 31 into 8-bit L-channel data and 8-bit R-channel data that is then alternately output.

As described above, the S/P converter 23 in the conventional descrambler converts the one-bit serial data (SIDATA) into 16-bit parallel data. The converted 16-bit data is then converted back into one-bit serial data with the P/S converter 29. This is because the descrambling data generator 21 outputs the descrambling data DSCR in one bit units. Having passed through the EX-OR gate 30, the one-bit data is converted into parallel data by the S/P converter 31. The conventional descrambler is slow due to the repeated serial-parallel conversions.

To solve the aforementioned problem, an object of the present invention is to provide a simplified descrambling data generating circuit for a CD ROM decoder which is capable of operating at high speeds.

The second object of the present invention is to provide a simple method for generating descrambling data in a CD ROM decoder.

Another object of the present invention is to provide a descrambler for a CD ROM decoder that uses the improved descrambling data generating circuit and method of the invention.

SUMMARY OF THE INVENTION $DSCR_{-1}[i]$ is an i-th bit of immediately preceding descrambling data. $DSCR_0[i]$ is an i-th bit of current descrambling data. $F_D[i]$ is an input signal of an i-th flip-flop, and $F_Q[i]$ is an output signal of the i-th flip-flop. A 32-bit descrambling data generating circuit includes a first exclusive OR (EX-OR) operating circuit that performs an EX-OR operation with respect to $DSCR_{-1}[i+2]$ and $DSCR_{-1}[i+4]$ when $1 \leq i \leq 15$ and outputs the operation result as $F_D[i]$. A latching circuit latches the $F_D[i]$ when $1 \leq i \leq 15$ and outputs a latched signal as $F_Q[i]$. A second EX-OR operating circuit performs an EX-OR operation with respect to $F_Q[i-14]$ and $F_Q[i-15]$ when $16 \leq i \leq 29$, and outputs the operation result as $DSCR_0[i]$. A third EX-OR operating circuit performs an EX-OR operation with respect to $DSCR_0[i-15]$ and $DSCR_0[i-16]$ when $30 \leq i \leq 32$, and outputs the operation result as $DSCR_0[i]$.

$DSCR_0[x]$ is an x-th bit of current 32-bit descrambling data. $DSCR_{-1}[x]$ is an x-th bit of preceding 32-bit descrambling data. A symbol $\oplus$ is defined as an EX-OR operation.

A descrambling data generating method for the CD ROM decoder generates lower first through fifteenth bits of descrambling data according to an equation (1), $$DSCR_0[x]=DSCR_{-1}[x+2]\oplus DSCR_{-1}[x+4] \text{ where } 1 \leq i \leq 15. \quad (1)$$

Upper sixteenth through thirty-second bits of the descrambling data are generated based on an equation (2), $$DSCR_0[x]=DSCR_0[x-15]\oplus DSCR_0[x-14] \text{ where } 16 \leq i \leq 32. \quad (2)$$

A descrambler for a CD-ROM decoder includes a serial-parallel converter and data ordering unit that converts serial data into parallel data. 32-bit parallel data is output in a data format according to a control signal. A 32-bit descrambling data generator generates 32-bit descrambling data. An EX-OR circuit performs an EX-OR operation with respect to the corresponding bits of data output from the serial-parallel converter and data ordering unit and the 32-bit descrambling data generator.

The foregoing and other objects, features and advantages of the invention will become more readily apparent from the following detailed description of a preferred embodiment of the invention which proceeds with reference to the accompanying drawings.

DETAILED DESCRIPTION OF THE INVENTION

Figure 1:
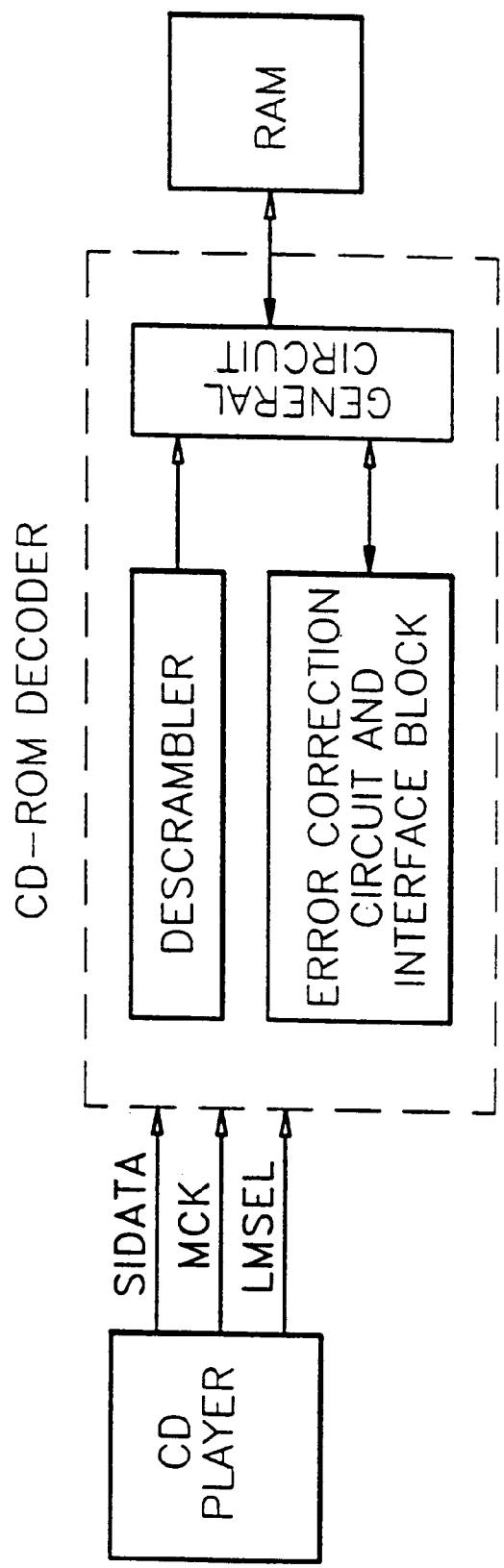
FIG. 1 is a schematic diagram of a general CD ROM decoder and peripheral devices.
Figure 2:
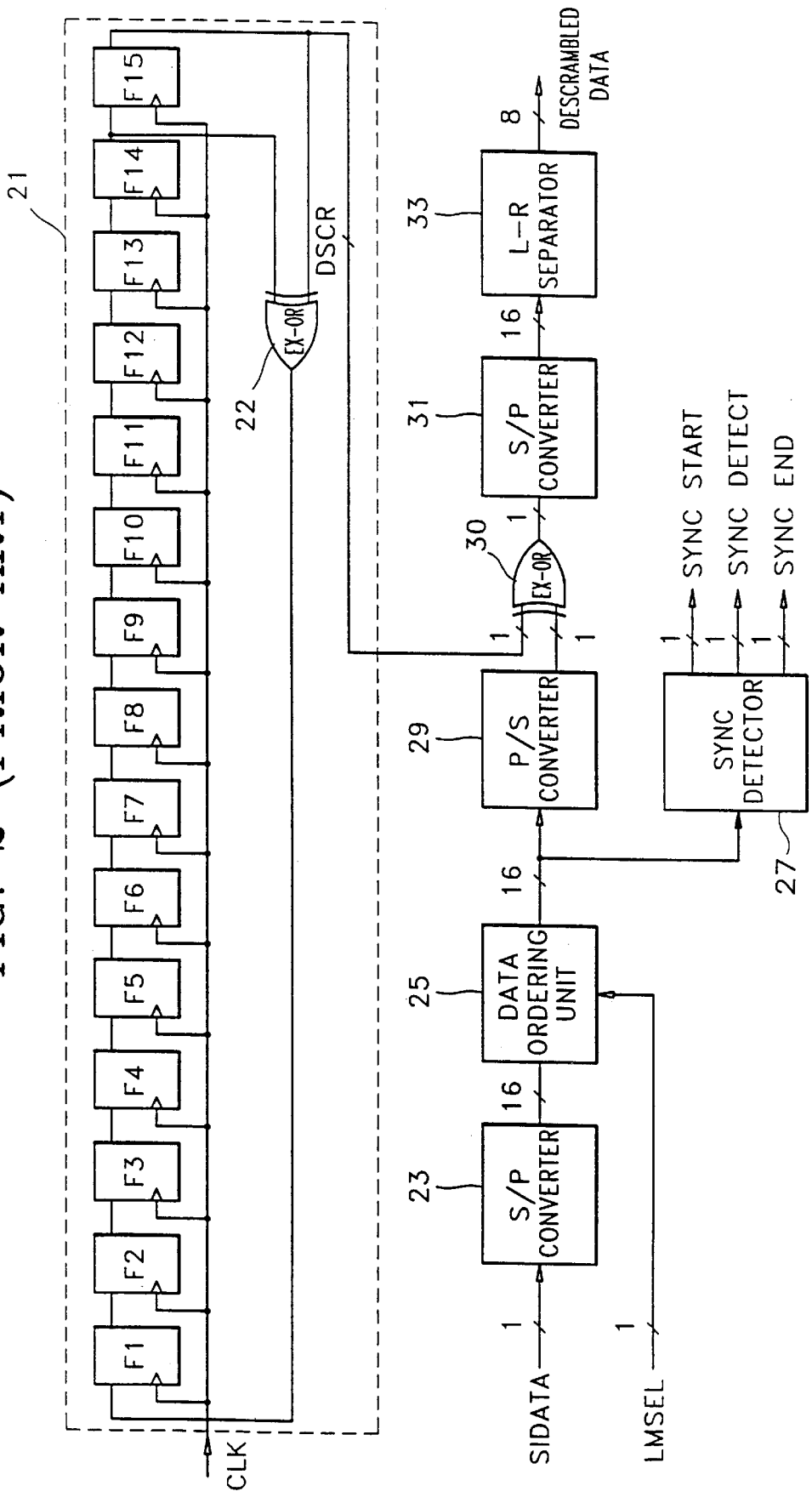
FIG. 2 is a block diagram of a conventional descrambler for a CD ROM decoder.
Figure 3:
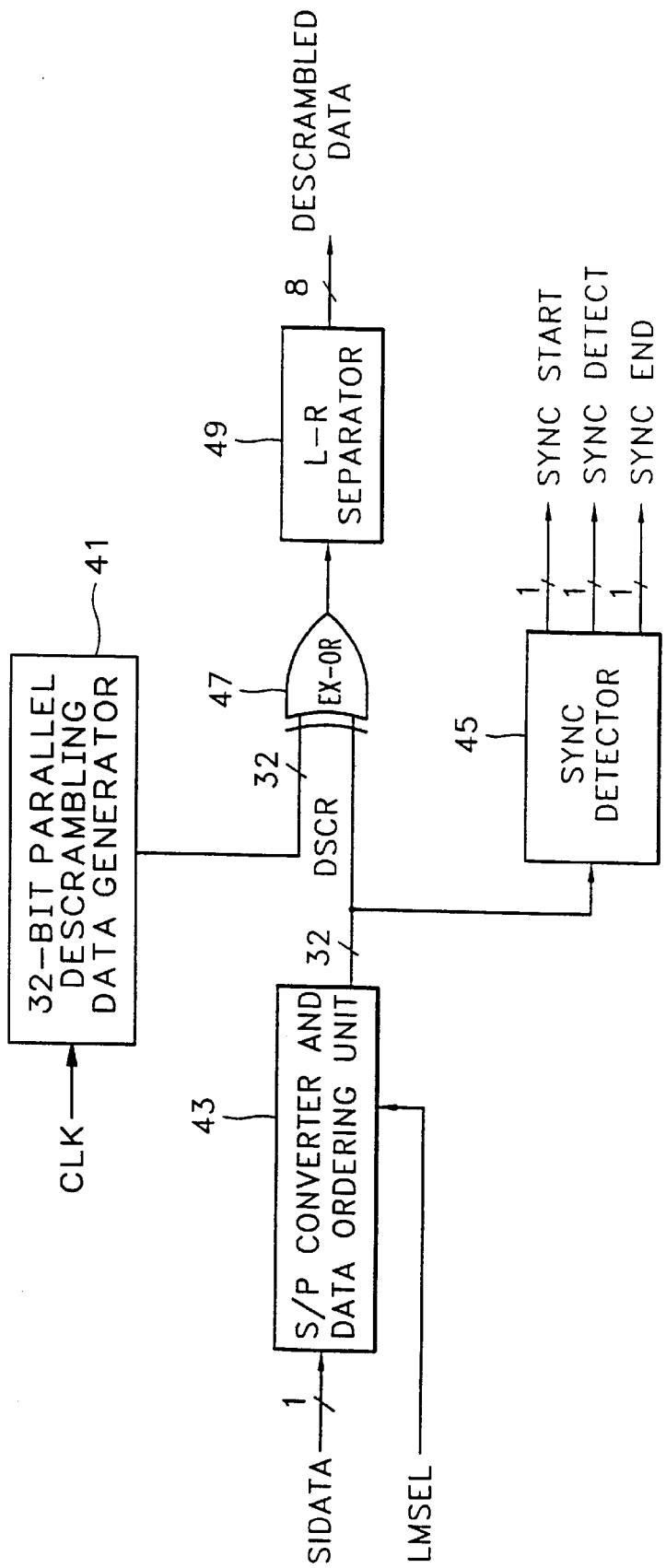
FIG. 3 is a block diagram of a descrambler for a CD ROM decoder according to an embodiment of the present invention.

Referring to FIG. 3, reference numerals 41, 43, 45, and 47 denote a 32-bit parallel descrambling data generator, a serial-parallel converter and data ordering unit, sync detector and an exclusive OR (EX-OR) operating unit, respectively. The 32-bit parallel descrambling data generator 41 is synchronized with a clock signal CLK and generates 32-bit descrambling data (PDSCR). The serial-parallel converter and data ordering unit 43 convert one-bit serial input data (SIDATA) from a compact disk player (not shown) into 32-bit parallel data, and determines a data format according to a control signal (LMSEL). The sync detector 45 detects sync signals, sync start, sync detect and sync end, from the 32-bit data output from the serial-parallel conversion and data ordering unit 43.

The EX-OR operating unit 47 includes 32 EX-OR gates each performing an exclusive OR operation with respect to the 2-bit data input from the serial-parallel converter and data ordering unit 43 and the 32-bit parallel descrambling data generator 41. A table below shows a process of deriving 32-bit descrambling data.

In the above equations. (1) and (2), $DSCR_{(n)}[x]$ represents an x-th bit of the n-th descrambling data and $DSCR_{(n+1)}[x]$ represents an x-th bit of the (n+1)-th descrambling data. In the above equation (1), in order to obtain the (n+1)-th descrambling data $DSCR_{(n+1)}[x]$, the immediately preceding descrambling data $DSCR_{(n+1)}[x]$ is needed. Thus, the 1st through 15th bits of the immediately preceding descrambling data should be buffered. In the equation (2), in order to obtain the (n+1)-th descrambling data $DSCR_{(n+1)}[x]$, the current descrambling data $DSCR_{(n+1)}[x]$ is needed and thus the 16th through 32nd bits of the immediately preceding descrambling data need not be buffered. That is, as shown in the equations (1) and (2), 32-bit parallel descrambling data can be generated with a 15-bit register.

Figure 4:
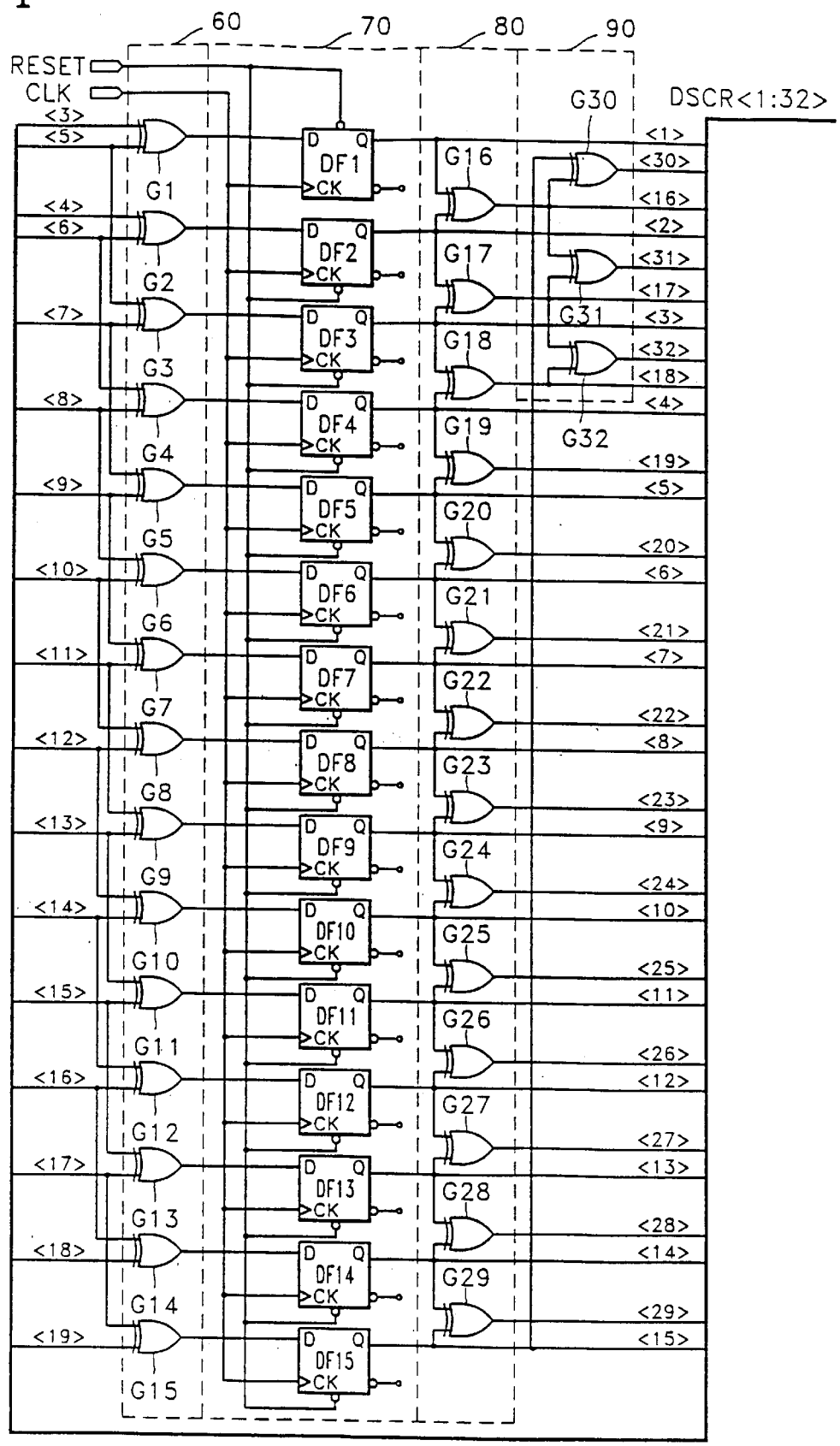
FIG. 4 is a detailed circuit diagram of a descrambling data generator for the CD ROM decoder shown in FIG. 3.

Referring to FIG. 4, reference numerals 60, 80 and 90 denote an EX-OR operating unit, respectively and reference numeral 70 denotes a flip-flop unit. The EX-OR operating unit 60 is constructed by 15 EX-OR gates G1~G15 and the connection relationship thereof is expressed as follows.

$$G_i = (in(DSCR_{-1}[i+2], DSCR_{-1}[i+4]), out(F_D[i])) \qquad (3)$$

where $1 \leq i \leq 15$, $DSCR_{-1}[x]$ represents an i-th bit of the immediately preceding descrambling data, and $F_D[i]$ represents an input signal of an i-th flip-flop.

According to the equation (3), an i-th EX-OR gate performs an EX-OR operation with respect to (i+2)-th and (i+4)-th bits of the preceding descrambling data and transmits the result to the i-th flip-flop. The latch unit 70 is constructed by 15 D flip-flops DF1~DF15. Each flip-flop receives a common clock signal and a common reset signal.

| BIT NUMBER | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| 1st DATA | 15 | 14 | 13 | 12 | 11 | 10 | 9 | 8 | 7 | 6 | 5 | 4 | 3 | 2 | 1 | 15 | 14 | 13 | 12 | 11 | 10 | 9 | 8 | 7 | 6 | 5 | 4 | 3 | 2 | 1 | 15 | 14 |
|  |  |  |  |  |  |  |  |  |  |  |  |  |  |  |  | 14 | 13 | 12 | 11 | 10 | 9 | 8 | 7 | 6 | 5 | 4 | 3 | 2 | 1 | 15 | 14 | 13 |
|  |  |  |  |  |  |  |  |  |  |  |  |  |  |  |  |  |  |  |  |  |  |  |  |  |  |  |  |  |  | 14 | 14 | 13 |
|  |  |  |  |  |  |  |  |  |  |  |  |  |  |  |  |  |  |  |  |  |  |  |  |  |  |  |  |  |  |  | 13 | 12 |
| 2nd DATA | | | 13 | 12 | 11 | 10 | 9 | 8 | 7 | 6 | 5 | 4 | 3 | 2 | 1 | 15 | 14 | 13 | 12 | 11 | 10 | 9 | 8 | 7 | 6 | 5 | 4 | 3 | 2 | 1 | 15 | 14 | 13 | 12 |

In the above Table, the boxed numbers can be excluded from the EX-OR operations.

$$DSCR_{(n+1)}[x] = DSCR_{(n)}[x+2] \oplus DSCR_{(n)}[x+4] \qquad (1)$$

where $1 \leq x \leq 15$.

$$DSCR_{(n+1)}[x] = DSCR_{(n+1)}[x-15] \oplus DSCR_{(n+1)}[x-14] \qquad (2)$$

where $16 \leq x \leq 32$.

The EX-OR operating unit 80 is constructed by 14 EX-OR gates G16~G29 and the connection relationship thereof is expressed as follows.

$$G_i = (in(F_Q[i-14], F_Q[i-15]), out(DSCR_0[i])) \qquad (4)$$

where $16 \leq i \leq 29$, $F_Q[i]$ represents the output signal of the i-th flip-flop, and $DSCR_0[i]$ represents an i-th bit of the current descrambling data. According to the equation (4), an i-th EX-OR gate performs an EX-OR operation with respect to the output signals of (i−14)-th and (i−15)-th flip-flops, and the operation result is output as an i-th bit of descrambling data.

The EX-OR operating unit 90 is constructed of three EX-OR gates G30~G32 and the connection relationship thereof is expressed as follows.

$$G_i = (in(DSCR_0[i-14], DSCR_0[i-15]), out(DSCR_0[i])) \quad (5),$$

where $30 \leq i \leq 32$, and $DSCR_0[i]$ represents an i-th bit of the current descrambling data. According to equation (5), an i-th EX-OR gate performs an EX-OR operation with respect to (i−14)-th and (i−15)-th bits of the current descrambling data, and the operation result is output as an i-th bit of the current descrambling data.

Referring back to FIG. 3, the serial-parallel converter and data ordering unit 43 converts one-bit serial data (SIDATA) input from a compact disk player (not shown) into 16-bit parallel data, and outputs 32-bit digital data by determining a data format according to a control signal (LMSEL). The 32-bit parallel descrambling data generator 41 generates 32-bit parallel descrambling data (PDSCR) according to the equations (1) and (2). The 32-bit data output from the 32-bit parallel descrambling data generator 41 and the output from serial-parallel converter and data ordering unit 43 are EX-OR'd with respect to the corresponding bits thereof by the EX-OR operating unit 47 to generate descrambled data. The descrambling process is performed in units of 32 bits at a time. Thus, the data is descrambled at higher speeds with a simplified circuit.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A circuit for generating descrambling data, comprising:
   a first exclusive OR (EX-OR) circuit having a series of inputs for receiving preceding descrambling data bits and having outputs;
   a latching circuit having inputs coupled to the outputs of the first exclusive OR circuit and outputs generating a first set of descrambling data bits;
   a second EX-OR circuit having inputs coupled to the outputs of the latching circuit and outputs generating a second set of descrambling data bits; and
   a third EX-OR circuit having a first input coupled to one of the outputs from the latching circuit, a second set of inputs coupled to the outputs of the second EX-OR circuit and outputs generating a third set of descrambling data bits.

2. A circuit for generating descrambling data, comprising:
   a first exclusive OR (EX-OR) circuit having a series of inputs for receiving preceding descrambling data bits and having outputs;
   a latching circuit having inputs coupled to the outputs of the first exclusive OR circuit and outputs generating a first set of descrambling data bits; and
   a second EX-OR circuit having inputs coupled to the outputs of the latching circuit and outputs generating a second set of descrambling data bits, wherein
   the inputs of the first exclusive OR (EX-OR) circuit receive preceding descrambling data bits $DSCR_{-1}[i+2]$ and $DSCR_{-1}[i+4]$ where $1 \leq i \leq 15$ and the outputs of the first exclusive OR circuit generate $F_D[i]$;
   the latching circuit inputs receive $F_D[i]$ and the latching circuit outputs generate signals $F_Q[i]$ where $1 \leq i \leq 15$;
   the inputs of the second EX-OR circuit receive $F_Q[i-14]$ and $F_Q[i-15]$ and the outputs of the second EX-OR generate $DSCR_0[i]$ where $16 \leq i \leq 29$;
   wherein $DSCR_{-1}[i]$ is an i-th bit of immediately preceding descrambling data, $DSCR_0[i]$ is an i-th bit of current descrambling data, $F_D[i]$ is an input signal of an i-th flip-flop, and $F_Q[i]$ is an output signal of said i-th flip-flop.

3. A circuit according to claim 2 wherein the inputs of the third EX-OR circuit receive descrambling data bits $DSCR_0[i-15]$ and $DSCR_0[i-16]$ and the outputs generate the descrambling data bits $DSCR_0[i]$ where $30 \leq i \leq 32$.

4. A method for descrambling data in a CD ROM decoder, comprising:
   receiving multiple data bits in parallel from preceding descrambling data;
   logically exclusive -ORing different combinations of the preceding descrambling data bits;
   buffering the exclusively -ORed data bits in parallel;
   outputting the buffered data bits in parallel as a first set of descrambling data bits;
   exclusively oring different combinations of the buffered data bits in parallel; and
   outputting the buffered exclusively ored data bits in parallel as a second set of descrambling data bits.

5. A method according to claim 4 wherein the first set of descrambling data bits are generated according to an equation $$DSCR_0[x] = DSCR_{-1}[x+2] \oplus DSCR_{-1}[x+4],$$

where $1 \leq i \leq 15$; and
   the second set of descrambling data bits are generated according to an equation $DSCR_0[x] = DSCR_0[x-15] \oplus DSCR_0[x-14]$, where $16 \leq i \leq 32$;
   $DSCR_0[x]$ being an x-th bit of a current 32-bit descrambling data word, $DSCR_{-1}[x]$ being an x-th bit of preceding 32-bit descrambling data word and a symbol $\oplus$ being an EX-OR operation.

6. A descrambler for a CD-ROM decoder, comprising:
   a serial-parallel converter and data ordering unit for converting serial data into parallel data bits and outputting the parallel data bits in a data format according to a control signal;
   a descrambling data generator for generating parallel descrambling data bits; and
   an EX-OR circuit for performing a parallel EX-OR operations on the data bits output from the serial-parallel converter and data ordering unit and the descrambling data generator.

7. A descrambler according to claim 6 wherein the descrambling data generator comprises:
   a first EX-OR circuit for performing an EX-OR operation with respect to $DSCR_{-1}[i+2]$ and $DSCR_{-1}[i+4]$ and outputting a result $F_D[i]$ where $1 \leq i \leq 15$;
   a latching circuit for latching the $F_D[i]$ and outputting the latched signal as $F_Q[i]$ where $1 \leq i \leq 15$;
   a second EX-OR circuit for performing an EX-OR operation with respect to $F_Q[i-14]$ and $F_Q[i-15]$ and outputting the EX-OR operation as $DSCR_0[i]$ where $16 \leq i \leq 29$; and a third EX-OR circuit for performing an EX-OR operation with respect to $DSCR_0[i-15]$ and $DSCR_0[i-16]$ and outputting the third EX-OR operation result as $DSCR_0[i]$, where wherein $DSCR_{-1}[i]$ is an i-th bit of preceding descrambling data, $DSCR_0[i]$ is an i-th bit of current descrambling data, $F_D[i]$ is the input signal of the i-th flip-flop, and $F_Q[i]$ is the output signal of the i-th flip-flop.

* * * * *

UNITED STATES PATENT AND TRADEMARK OFFICE
CERTIFICATE OF CORRECTION

PATENT NO. : 5,984,521 Page 1 of 1
DATED : November 16, 1997
INVENTOR(S) : Sung-jo Bang It is certified that error appears in the above-identified patent and that said Letters Patent is hereby corrected as shown below:

<u>Column 4,</u>
Line 6, "DSCR(n+1)[x]" should read -- DSCR(n)[x] --.
Line 23, "123 i $\leqq$ 15" should read -- $1 \leqq i \leqq 15$ --.

<u>Column 7,</u>
Line 6, "where" should read -- where $30 \leqq i \leqq 32$ --.

Signed and Sealed this

Twenty-first Day of January, 2003

JAMES E. ROGAN
*Director of the United States Patent and Trademark Office*